United States Patent [19]

Jackson

[11] Patent Number: 4,926,610
[45] Date of Patent: May 22, 1990

[54] VARIABLE-WIDTH MOLDING AND BRIGHTWORK

[75] Inventor: Norman C. Jackson, Livonia, Mich.

[73] Assignee: The Standard Products Company, Cleveland, Ohio

[21] Appl. No.: 282,708

[22] Filed: Dec. 12, 1988

[51] Int. Cl.⁵ ............................................. B60R 27/00
[52] U.S. Cl. ........................................ 52/716; 293/120
[58] Field of Search .................... 52/716, 290, 288; 293/1, 120, 128

[56] References Cited

U.S. PATENT DOCUMENTS

| | | |
|---|---|---|
| 3,081,119 | 3/1963 | Dison . |
| 3,123,909 | 3/1964 | Dorst . |
| 3,451,709 | 6/1969 | Swauger .............................. 428/31 |
| 3,659,887 | 5/1972 | Marquette ........................... 293/120 |
| 3,831,334 | 8/1974 | Ruthowski ............................ 52/290 |
| 4,066,285 | 1/1978 | Hall et al. . |
| 4,350,550 | 9/1981 | Van Manen . |
| 4,440,814 | 4/1984 | Wolters . |
| 4,461,503 | 7/1984 | Melby . |
| 4,491,614 | 1/1985 | Wolters ................................. 428/31 |
| 4,579,755 | 4/1986 | Takeda et al. . |
| 4,592,937 | 6/1986 | Nagata et al. . |

Primary Examiner—John E. Murtagh
Attorney, Agent, or Firm—Harness, Dickey & Pierce

[57] ABSTRACT

A body side molding for automotive vehicles has an L-shaped receiver and an elongated member overlappingly interfitted with the receiver. The width of the body side molding and the visible portion of its brightwork is dependent upon the degree of overlap of the elongated member by the receiver and can be varied along the length of the molding strip.

8 Claims, 2 Drawing Sheets

VARIABLE-WIDTH MOLDING AND BRIGHTWORK

BACKGROUND OF THE INVENTION

The present invention relates generally to moldings, more particularly to a variable-width moldings such as body side moldings for motor vehicles.

Body side moldings are widely used to protect and improve the appearance of motor vehicles. The moldings are particularly effective in protecting the sides of a vehicle from damage caused by door strikes. Many body side moldings also include a metallized layer, commonly referred to as "brightwork", on their outer visible surfaces to further enhance the aesthetic appearance of the vehicle.

Automotive body side moldings are produced in strips of a variety of sizes and configurations, depending upon their intended use and desired appearance. However, the configuration and manufacture of conventional body side moldings are generally that of an elongated strip of a single unvarying width. Moreover, since body side moldings are generally formed by extrusion, separate extrusion dies and equipment are required to produce molding strips of different widths.

However, it would be desirable to provide a body side molding whose width can be varied along its length. It would also be desirable to provide a body side molding with brightwork in which the width of either can be varied along their length. It would further be desirable to provide a body side molding in which separate strips of different widths can be made without modifying the equipment used in their manufacture.

SUMMARY OF THE INVENTION

The body side molding of the present invention comprises a generally L-shaped elongated receiver and an elongated member interfitted with the receiver. The receiver further comprises first and second arms defining the receiver's L-shape. In operative assembly, an arm of the receiver overlaps at least a portion of the elongated member.

The overlapping arrangement of the receiver and elongated member provides a strip of molding whose width and visible portion of the elongated member can be varied along its length. By providing th elongated member with an outer surface of a color different from the receiver or with brightwork thereon, the visible portion of the color or brightwork of the member's outer surface can also be varied.

The receiver and elongated member are assembled into a single strip of body side molding by a method wherein the receiver and member are interfitted by means of a roller assembly and then bonded together. The degree of overlap of the receiver arm and elongated member determines the width of the strip of body side molding and the visible portion of the outer surface of the member. If the extent of overlap is varied along the length of the strip of molding, body side molding of variable width and variable visible portion of elongated member's outer surface is provided.

These and other advantages of the body side molding of the present invention will become apparent upon a reading of the detailed description taken in conjunction with the drawings which follow.

DETAILED DESCRIPTION OF THE PREFERRED EMBODIMENT

Figure 1:
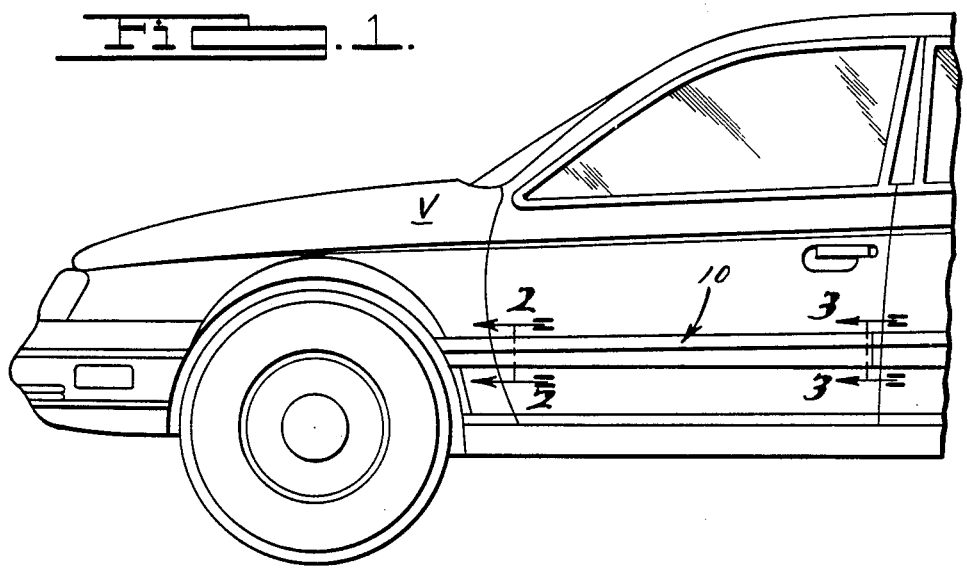
FIG. 1 is a side view of a preferred embodiment of a strip of the body side molding of the present invention shown attached to a motor vehicle.

Referring to FIG. 1, a preferred embodiment of a strip of body side molding of the present invention mounted on a motor vehicle V is shown and indicated generally by the numeral 10. As shown in FIG. 1, the width of strip 10 varies along its length, widening as strip 10 extends toward the rear of motor vehicle V.

Figure 2:
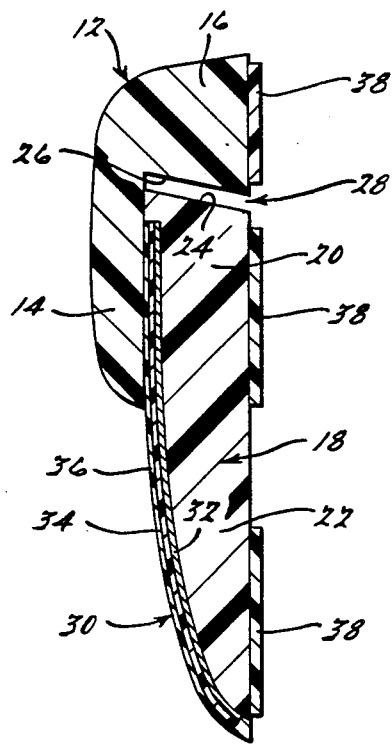
FIG. 2 is a sectional view taken along the line 2—2 of FIG. 1.

Referring now to FIG. 2, a sectional view of strip 10 taken along the line 2—2 in FIG. 1 is shown. As illustrated in cross-section, strip 10 comprises a generally L-shaped receiver 12 defined by a first arm 14 and a second arm 16 and an elongated member 18 interfitted with receiver 12. As shown in FIG. 2, when receiver 12 and elongated member 18 are assembled to form strip 10, receiver arm 14 overlaps a portion 20 of elongated member 18 which masks the outer surface of that portion 20 from view when strip 10 is mounted on vehicle V. The portion 22 of elongated member 18 which is not overlapped by receiver arm 14, however, remains visible. When receiver arm 14 is not entirely engaged in overlapping arrangement with elongated member 18, and surface 24 of portion 20 and surface 26 of receiver arm 16 do not abut, receiver 12 and member 18 define a channel 28 therebetween.

As shown in FIG. 2, elongated member 18 preferably includes a layered laminate, hereinafter referred to as "brightwork" 30, bonded to its outer surface. Brightwork 30 generally comprises a layer 32 of aluminum or other metal which has been vacuum metallized onto a thin transparent film 34 of polyester or other polymers to give visible portion 22 of elongated member 18 a decorative metallic appearance. Also shown in FIG. 2, brightwork 30 further comprises a thin transparent over layer 36 which covers and protects the outer surface of the film 34. Suitable material for cover layer 36 include vinyl compounds or ionomeric resins such as "Surlyn", available commercially from E. I. duPont Nemours & Co. Optionally, an additional coating can be used to further protect brightwork 30 from UV light.

Strip 10 of the present invention further includes means for attachment to motor vehicle V. Suitable means includes adhesive means 38, such as shown in FIG. 2. For ease of attachment, double-sided pressure-sensitive adhesive tape, such as is conventional in the art is preferred.

Figure 3:
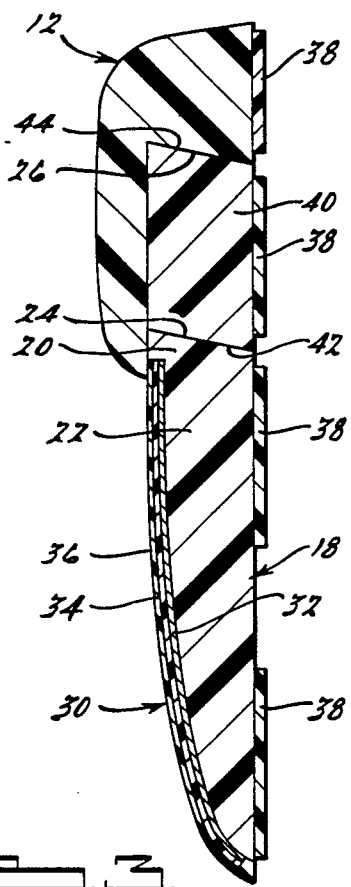
FIG. 3 is a sectional view taken along the line 3—3 of FIG. 1.

The width of strip 10 and its visible brightwork 30 can be varied by the degree to which elongated member 18 is overlapped by receiver arm 14. Thus, referring to FIG. 3, where the degree of overlap is decreased relative to the degree of overlap in FIG. 2, the width of strip 10 and visible portion 20 of elongated member 18 is increased. When, as in FIG. 3, the overlap of elongated member 18 by receiver arm is relatively small and channel 28 relatively wide, additional support for strip 10 may be required to avoid buckling of the molding when in use. Thus, for example as shown in FIG. 3, a support strip or piece 40 can be bonded into channel 28, preferably with one end surface 42 abutting the surface 24 of portion 20 and the opposite end surface 44 abutting surface 26 of receiver arm 14. It should be appreciated, however, that any suitable support means, such as a support wire embedded in receiver 12 or a foam injected to fill channel 28 can also be employed to supply the desired support.

Figure 4:
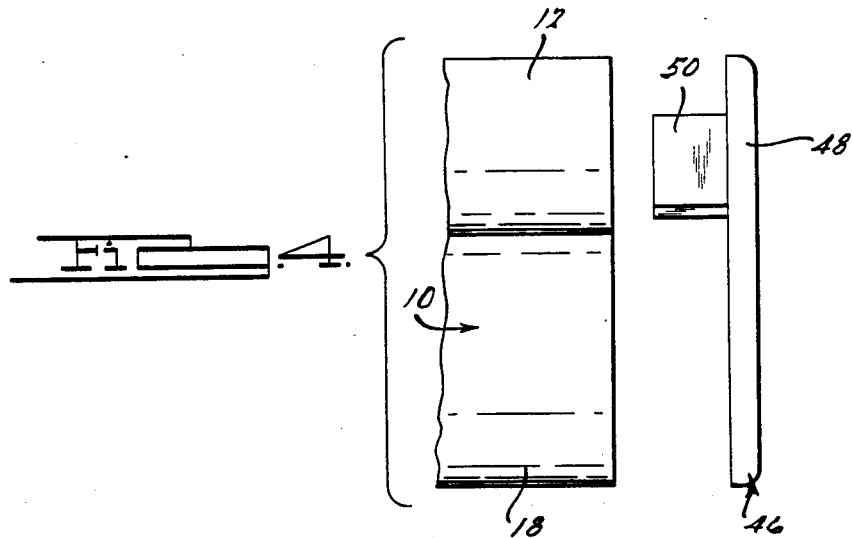
FIG. 4 is an exploded side elevational view, broken away, of a preferred embodiment of an end cap of body side molding of the present invention.

Once strip 10 is mounted on motor vehicle V, the ends of strip 10 are preferably capped to seal channel 28 from the external environment and prevent accumulation of water and debris therein. Referring now to FIG. 4, a side view of a preferred embodiment of an end cap 46 of the present invention for sealing the ends of strip 10 is shown. As illustrated in FIG. 4, end cap 46 comprises a cap portion 48 from which extends a projection 50 which, when end cap 46 is in place at an end of strip 10, fits into and seals channel 28 from the external environment. If desired, cap portion 48 can be provided with brightwork corresponding in position and width to the brightwork at that end of strip 10.

Figure 5:
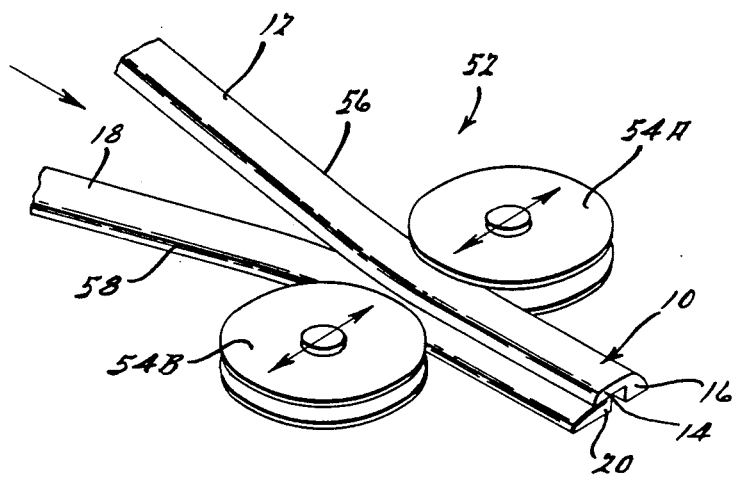
FIG. 5 is a schematic representation of a preferred method of assembly of a strip of body side molding of the present invention.

Turning now to FIG. 5, a schematic representation of a roller assembly for assembling strip 10 of the present invention is shown and indicated generally by the numeral 52. As shown in FIG. 5, roller assembly 52 comprises a set of rollers 54A, 54B, between which pass the receiver 12 and elongated member 18. As receiver 12 and elongated member 18 proceed through roller assembly 52, rollers 54A, 54B contact the lateral outer edges 56 of receiver 12 and 58 of elongated member 18 to selectively interfit portion 20 into underlapping engagement with receiver arm 14. Receiver 12 and elongated member 18 are then bonded together to form a single strip 10 of molding. The distance between rollers 54A, 54B can be selectively varied to achieve the desired degree of overlap of receiver 12 and elongated member 18.

As illustrated in FIGS. 1–3 and 5, the configuration of receiver 12 and elongated member 18 and their overlapping arrangement allows the width of strip 10 and the visible portion 20 of elongated member 18 and any brightwork 30 thereon to be varied along the length of strip 10. In addition, because the width and visible portion of strip 10 of the body side molding of the present invention can be varied, separate strips of molding comprised of the same receiver and elongated member, but having different widths, can also be assembled using the same equipment by simply varying the degree of overlap of the elongated member and the receiver.

It should also be understood that the invention described herein is not limited to molding strips with brightwork thereon. For example, body side moldings of variable or single widths can be manufactured and assembled in accordance with the principles of the present invention using elongated members and receivers of the same color for a uniform appearance or of different colors to provide a two-tone molding strip.

It should be appreciated that a latitude of modification, change and substitution is intended in the foregoing disclosure and, in certain instances, some features of the invention will be employed without a corresponding use of other features. Accordingly, it is appropriate that the appended claims be construed broadly and in a manner consistent with the spirit and the scope of the invention herein.

What is claimed is:

1. A body side molding comprising:
   an elongated member having an inner and outer surface;
   an elongated receiver, L-shaped in cross-section, adapted for interfitting engagement with said elongated member, said receiver having a first arm and a second arm connected to said first arm, said arms defining said L-shape of said receiver;
   said elongated member having a portion being received between said arms of said receiver and being overlapped by one of said arms of said receiver, wherein said width of said molding can be varied by varying the degree of overlap of said elongated member by said overlapping arm of said receiver;
   brightwork covering at least a portion of said outer surface of said elongated member, said brightwork having a visible portion which can be varied by varying the degree of overlap of said elongated member by said receiver, said brightwork comprising a metallic-appearing layer; and
   an end cap adapted for sealing engagement with an end of said molding.

2. The molding of claim 1 wherein said L-shaped receiver and said elongated member in interfitting engagement define a channel therebetween.

3. The molding of claim 2 wherein said end cap has a cap portion and a projection extending from said cap portion, said projection extending into said channel.

4. The molding of claim 2 further including a support piece positioned within said channel and bonded to at least one of said L-shaped receiver and elongated member.

5. The molding of claim 3 further including a support piece positioned within said channel and bonded to at least one of said L-shaped receiver and elongated member.

6. The molding of claim 2 wherein each of said L-shaped receiver and elongated member have adhesive means for attachment to an automotive vehicle.

7. The molding of claim 3 wherein each of said L-shaped receiver and elongated member have adhesive means for attachment to an automotive vehicle.

8. The molding of claim 7 wherein said brightwork comprises a laminate of layers of metallized polymeric film and a transparent cover layer.

* * * * *